United States Patent
Bar-El et al.

(10) Patent No.: US 8,369,526 B2
(45) Date of Patent: Feb. 5, 2013

(54) DEVICE, SYSTEM, AND METHOD OF SECURELY EXECUTING APPLICATIONS

(75) Inventors: Hagai Bar-El, Rehovot (IL); Sara Bitan-Erlich, Hadar-Am (IL)

(73) Assignee: Discretix Technologies Ltd., Netanya (IL)

( * ) Notice: Subject to any disclaimer, the term of this patent is extended or adjusted under 35 U.S.C. 154(b) by 1030 days.

(21) Appl. No.: 12/369,786

(22) Filed: Feb. 12, 2009

(65) Prior Publication Data

US 2009/0202078 A1 Aug. 13, 2009

Related U.S. Application Data

(60) Provisional application No. 61/027,899, filed on Feb. 12, 2008.

(51) Int. Cl.
*H04L 9/00* (2006.01)
*H04L 9/32* (2006.01)

(52) U.S. Cl. ........................ 380/277; 713/168

(58) Field of Classification Search .................. 380/277, 380/278; 713/164, 168, 187, 189, 193, 194; 726/27, 34
See application file for complete search history.

(56) References Cited

U.S. PATENT DOCUMENTS

| | | | | |
|---|---|---|---|---|
| 7,681,046 | B1* | 3/2010 | Morgan et al. | 713/193 |
| 7,966,465 | B2* | 6/2011 | Rodgers | 711/163 |
| 2004/0034785 | A1* | 2/2004 | Tai et al. | 713/189 |
| 2006/0090084 | A1* | 4/2006 | Buer | 713/189 |
| 2007/0180271 | A1* | 8/2007 | Hatakeyama et al. | 713/193 |
| 2007/0192631 | A1* | 8/2007 | Anderson | 713/193 |

FOREIGN PATENT DOCUMENTS

JP 2002208216 A * 7/2002

\* cited by examiner

*Primary Examiner* — Nathan Flynn
*Assistant Examiner* — Abdullah Almamun
(74) *Attorney, Agent, or Firm* — Eitan, Mehulal & Sadot

(57) ABSTRACT

Device, system, and method of executing secure-processing (SEP) applications. Some demonstrative embodiments include a secure-processing (SEP) hardware module including a processor capable of executing at least one SEP application, wherein the SEP hardware module is configured to perform at least one of encrypting and decrypting data handled by the SEP application using an application-specific application-key corresponding to the SEP application, only if the processor begins execution of the SEP application at an approved entry point of the SEP application, and wherein the application-key corresponding to the SEP application is based at least on an internal key internally stored by the SEP hardware module and on application-specific information corresponding to the SEP application. Other embodiments are described and claimed.

21 Claims, 2 Drawing Sheets

DEVICE, SYSTEM, AND METHOD OF SECURELY EXECUTING APPLICATIONS

CROSS-REFERENCE

This application claims priority from and the benefit of U.S. Provisional Patent application 61/027,899, entitled "System and method for trusted execution environment", filed Feb. 12, 2008, the entire disclosure of which is incorporated herein by reference.

FIELD

Some embodiments relate generally to the field of executing applications and, more particularly, to secure execution of distrusting applications.

BACKGROUND

Many software applications ("applications"), for example, e-commerce applications, Digital-Rights-Management (DRM) applications, and the like, often maintain secret and/or restricted information, which is not to be exposed and/or tampered with.

Such applications may require a platform on which multiple applications can be executed on a shared processing unit, while retaining separation from one another.

One solution of separation between executed applications may be provided by the Operating System (OS), often assisted with Memory Management Units (MMUs) and/or Memory Protection Units (MPUs). Operating systems are often programmed to allow several applications to be executed in some order, without one application being able to read Random-Access-Memory (RAM) contents, and/or access stored data of other applications. Operating Systems, however, are typically software based, and thus may sometimes be exploited into violating the security model that they are trusted to keep. Moreover, sometimes their complex nature makes them inadequate for some environments.

Other solutions for separation between executed applications are based on running the different applications on different platforms, or at least on different processors. Such solutions may be viable, but they are rather costly as they imply deploying more than one processor. Sometimes, such solutions form too complete of a separation, disallowing applications to share data among them, even when desired.

Other solutions are available in specifically designed architectures, such as the one deployed by the ARM TrustZone® product. Such solutions may base the separation between the executed applications on states of the processor. These solutions may be limited by allowing for separation between only two modes (often referred to as "secure" versus "insecure"), and sometimes may not scale well to situations of multiple mutually-distrusting applications. Such solutions sometimes also lack protection of the contents that are stored in RAM, and/or in non-volatile storage.

SUMMARY

Some embodiments include devices, systems, and/or methods of securely executing applications.

Some embodiments include devices, systems and/or methods providing a computing platform on which multiple applications can be executed on a shared processing unit, while retaining isolation from one another. The computing platform may be used by a plurality of applications, e.g., having different trust domains, having different trustworthiness, and/or which may be written by mutually-distrusting entities ("developers", "providers", "generators" or "creators").

Some embodiments include a hardware module configured to assure a creator of an application that other creators cannot introduce applications that will violate the security model of the application. This assurance can be obtained at the hardware level, without relying an Operating System (OS) application, for example, in a way that does not rely on the trustworthiness and/or soundness of any software module. The hardware module may assure, for example, that each application can neither read other applications' Random Access Memory (RAM) contents, nor content that was stored in non-volatile memory, e.g., even though the application has complete control of the processor while it is running.

Some demonstrative embodiments include a device including a secure-processing (SEP) hardware module, which includes a processor capable of executing at least one SEP application, wherein the SEP hardware module is configured to perform at least one of encrypting and decrypting data handled by the SEP application using an application-specific application-key corresponding to the SEP application, only if the processor begins execution of the SEP application at an approved entry point of the SEP application, wherein the application-key corresponding to the SEP application is based at least on an internal key internally stored by the SEP hardware module and on application-specific information corresponding to the SEP application.

In some embodiments, the application-specific information includes information predefined by a creator of the SEP application.

In some demonstrative embodiments, the application-specific information includes one or more of information representing a developer public key of the creator, and information identifying the SEP application.

In some demonstrative embodiments, the SEP hardware module includes a memory encryption hardware module to store in a memory encrypted data, which is encrypted using an application-specific memory encryption key corresponding to the SEP application, wherein the SEP hardware module is configured to determine the memory encryption key based at least on the application-specific information.

In some demonstrative embodiments, the memory encryption key is based also on a random boot value, which is determined upon boot.

In some demonstrative embodiments, the SEP hardware module is configured to determine a plurality of application-specific descriptor values corresponding to a plurality of SEP applications based at least on application-specific information of the SEP applications, respectively; to store the descriptor values; and to determine the application-key corresponding to the SEP application based on the descriptor value corresponding to the SEP application.

In some demonstrative embodiments, the SEP hardware module is configured to use an inter-application key to encrypt and decrypt data communicated between first and second SEP applications, wherein the inter-application key is based on the internal key, the application-specific information corresponding to the first SEP application and application-specific information corresponding to the second SEP application.

In some demonstrative embodiments, the SEP hardware module is to receive the application-specific information corresponding to the second SEP application from the first SEP application.

In some demonstrative embodiments, the SEP hardware module includes a hardware memory watcher to prevent at least write-access to at least one set of memory addresses corresponding to the at least one SEP application, respectively.

Some embodiments include a method of executing at least one secure-processing (SEP) application, the method including, only if execution of the SEP application begins at an approved entry point of the SEP application, performing at least one of encrypting and decrypting data handled by the SEP application using an application-specific application-key corresponding to the SEP application, wherein the application-key corresponding to the SEP application is based at least on an internal key and on application-specific information corresponding to the SEP application.

In some embodiments, the application-specific information includes information predefined by a creator of the SEP application.

In some demonstrative embodiments, the method may include jointly performing both forcing a processor to jump to the approved entry point of the SEP application, and switching to security-context corresponding to the SEP application, wherein the security context includes information, which allows determining the application-key corresponding to the SEP application.

In some demonstrative embodiments, the application-specific information includes one or more of information representing a developer public key of the creator, and information identifying the SEP application.

In some demonstrative embodiments, the method may include determining an application-specific memory encryption key corresponding to the SEP application based at least on the application-specific information; and storing in a memory encrypted data, which is encrypted using the memory encryption key.

In some demonstrative embodiments, determining the memory encryption key includes determining the memory encryption key based also on a random boot value, which is determined upon boot.

In some demonstrative embodiments, the method may include determining a plurality of application-specific descriptor values corresponding to a plurality of SEP applications based at least on the application-specific information of the SEP applications, respectively; storing the descriptor values; and determining the application-key corresponding to a SEP application of the plurality of SEP applications based on the descriptor value corresponding to the SEP application.

In some demonstrative embodiments, the method may include determining an inter-application key based on the internal key, the application-specific information corresponding to a SEP application and application-specific information corresponding to another SEP application; and performing at least one of encrypting and decrypting data communicated between the SEP application and the other SEP application using the inter-application key.

Some embodiments include a system including a memory to store at least one secure-processing (SEP) application; and a SEP hardware module including a processor capable of executing the at least one SEP application, wherein the SEP hardware module is configured to perform at least one of encrypting and decrypting data handled by the SEP application using an application-specific application-key corresponding to the SEP application, only if the processor begins execution of the SEP application at an approved entry point of the SEP application, wherein the application-key corresponding to the SEP application is based at least on an internal key internally stored by the SEP hardware module and on application-specific information corresponding to the SEP application.

In some embodiments, the application-specific information includes information predefined by a creator of the SEP application.

In some demonstrative embodiments, the application-specific information includes one or more of information representing a developer public key of the creator, and information identifying SEP application.

In some demonstrative embodiments, the secure-processing hardware module includes a memory encryption hardware module to store in a memory encrypted data, which is encrypted using an application-specific memory encryption key corresponding to the SEP application being executed, wherein the secure-processing hardware module is configured to determine the memory encryption key based at least on the application-specific information.

In some demonstrative embodiments, the memory encryption key is based also on a random boot value, which is determined upon boot.

In some demonstrative embodiments, the secure-processing hardware module is configured to determine a plurality of application-specific descriptor values corresponding to a plurality of SEP applications based at least on the application-specific information of the SEP applications, respectively; to store the descriptor values; and to determine the application-key corresponding to a SEP application of the plurality of SEP applications based on the descriptor value corresponding to the SEP application.

In some demonstrative embodiments, the secure-processing hardware module is configured to use an inter-application key to encrypt and decrypt data communicated between the first and second SEP applications, and wherein the inter-application key is based on the internal key, the application-specific information corresponding to the first SEP application and application-specific information corresponding to the second SEP application.

In some demonstrative embodiments, the SEP hardware module is to receive the application-specific information corresponding to the second SEP application from the first SEP application.

In some demonstrative embodiments, the SEP hardware module is configured to prevent the disclosure of the application key to the SEP application.

In some demonstrative embodiments, the SEP hardware module includes a hardware memory watcher to prevent at least write-access to at least one set of memory addresses corresponding to the at least one SEP application, respectively.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
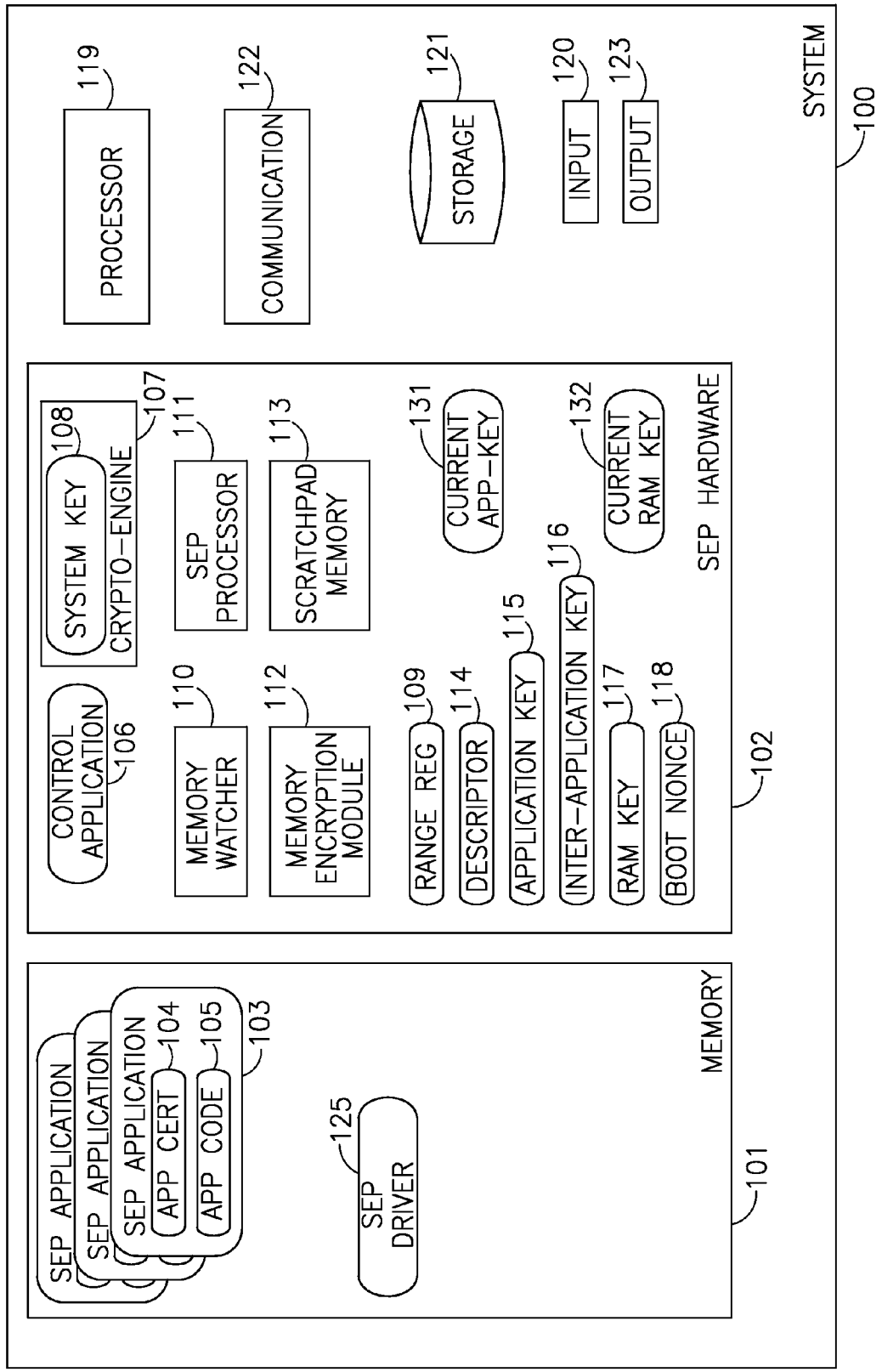
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

The term "register" as used herein refers to any suitable information element, which may be implemented in the form of a hardware register or in any other suitable hardware or non-hardware form.

Some embodiments may include one or more wired or wireless links, may utilize one or more components of wireless communication, may utilize one or more methods or protocols of wireless communication, or the like. Some embodiments may utilize wired communication and/or wireless communication.

The phrase "Secure-Processing (SEP) application" as used herein includes any suitable software application, program, code, instructions, commands, and the like, capable of being executed by a SEP hardware module as described herein.

Some embodiments include a SEP hardware module that facilitates the execution of one or more SEP applications. The SEP hardware module may be configured to allow SEP applications that were written by various developers to run on the same computing platform without having to trust each other. For example, the SEP hardware module may prevent a SEP application running on the computing platform from gaining useful access to data that was stored by another SEP application in secondary storage.

In some demonstrative embodiments, a memory, such as a main memory, which may be, for example, external to the SEP hardware module, may be used to store application code and/or data of SEP applications. The application code and/or data may need to be protected from other applications, e.g., both from the other SEP applications which run on the SEP hardware and from applications which run on other components of the computing platform. In some demonstrative embodiments, memory encryption and/or memory access watching, e.g., as described herein, may assist in protecting such data.

Some embodiments may include devices, systems and/or methods to allow a single computing platform to be used by several SEP applications, which may be provided by several providers. A provider of a SEP application may not have agreements with other applications providers in a way that may facilitate trust of the type that is required for the provider to allow the SEP application to execute on the same platform with other, potentially malicious, applications, e.g., SEP applications of the other providers.

The devices, systems and/or methods may allow, for example, the owner, or other relying party, of a commerce application to have its commerce application run on a computing platform that also runs a commerce application by another vendor, or an application which the owner otherwise does not trust. As another example, the devices, systems and/or methods may allow the owner, or other relying party, of a commerce application to have its commerce application run on a computing platform that also runs arbitrary code that the user of the computing platform downloads from untrusted sources, such as the Internet.

Devices, systems and/or methods, in accordance with some embodiments, may allow a SEP application to store data in secondary storage, such as on Flash memory, or on a hard disk, encrypted in a way that prevents to a reasonable extent other SEP applications and other applications in general from interpreting and/or altering the stored information.

Devices, systems and/or methods, in accordance with some embodiments, may allow a SEP application to store data in primary storage, such as in Random Access Memory (RAM), encrypted in a way that prevents to a reasonable extent other SEP applications and other applications in general from interpreting and/or altering the stored information.

Devices, systems and/or methods, in accordance with some embodiments, may allow two SEP applications to exchange information among themselves in a way that both SEP applications can be assured to a reasonable extent that the information exchanged cannot be interpreted and/or altered without the fact being detected, by other SEP applications or applications in general.

FIG. 1 schematically illustrates a block diagram of a system 100 in accordance with some demonstrative embodiments.

In some demonstrative embodiments, system 100 may include a SEP hardware module 102 including a SEP processor 111 capable of executing at least one SEP application 103, e.g., as described in detail below. SEP processor 111 may execute SEP application 103 by executing suitable SEP application code 105, which may be stored, for example, by a memory 101 or in any other suitable memory or storage, e.g., external to SEP hardware module 102 or internally within SEP hardware module 102.

In some demonstrative embodiments, SEP hardware module 102 may include any suitable protection mechanism, e.g., any suitable "physical" protection structure and/or any other suitable protection configuration, for example, to substantially prevent the disclosure of any part of the contents of SEP hardware module 102, to substantially prevent any attempt to access any part of the contents of SEP hardware module 102, to substantially prevent any attempt to tamper or alter the contents of SEP hardware module 102, in part or in whole, to substantially prevent any attempt to interfere with the operation of SEP hardware module 102, and/or to provide any additional or alternative protection and/or security features to SEP hardware module 102.

In some demonstrative embodiments, system 100 may also include a processor 119, a storage unit 121, an input unit 120, an output unit 123, a communication unit 122, and/or any other suitable component.

Processors 111 and/or 119 include, for example, a multi-core processor (CMP), a multiprocessor, a central processing unit (CPU), a digital signal processor (DSP), a microprocessor, a controller, a plurality of processors or controllers, a chip, a microchip, circuitry, a logic unit, an integrated circuit (IC), an application-specific IC (ASIC), or any other suitable multi-purpose or specific processor or controller capable of executing instructions of software applications.

Memory 101 includes, for example, a random access memory (RAM), a dynamic RAM (DRAM), a synchronous DRAM (SD-RAM), a flash memory, a volatile memory, or other suitable memory unit.

Storage unit 121 includes, for example, a hard disk drive, a floppy disk drive, a compact disk (CD) drive, a CD-ROM drive, a digital versatile disk (DVD) drive, or other suitable removable or non-removable storage units capable of storing data processed by processor 119 and/or SEP processor 111.

Input unit 120 includes, for example, a keyboard, a keypad, a mouse, a touch-pad, a stylus, a microphone, or other suitable pointing device or input device.

Output unit 123 includes, for example, a cathode ray tube (CRT) monitor or display unit, a liquid crystal display (LCD) monitor or display unit, a screen, a monitor, a speaker, or other suitable audio, image and/or video display or output device.

Communication unit 122 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 122 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some demonstrative embodiments, system 100 may include, or may be, a computing platform, a Personal Computer (PC); a desktop computer; a mobile computer; a laptop computer; a notebook computer; a tablet computer; a server computer; a handheld computer; a handheld device; a Personal Digital Assistant (PDA) device; a handheld PDA device; a Set Top Box (STB); a media-playing device, e.g., a MP3 player device, an MP4 player device, or the like; an on-board device; an off-board device; a hybrid device; a vehicular device; a non-vehicular device; a mobile or portable device; a non-mobile or non-portable device; a wireless communication station; a wireless communication device; a unit or device of a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), a two-way radio communication system, and/or a cellular radio-telephone communication system; a cellular telephone; a wireless telephone; a Personal Communication Systems (PCS) device; a PDA device which incorporates a wireless communication device; a mobile or portable Global Positioning System (GPS) device; a device which incorporates a GPS receiver or transceiver or chip; a Multiple Input Multiple Output (MIMO) device; a Single Input Multiple Output (SIMO) device, a Multiple Input Single Output (MISO) transceiver or device; a multi-standard radio device, a wired or wireless handheld device (e.g., BlackBerry, Palm Treo), a Wireless Application Protocol (WAP) device, or the like.

In some demonstrative embodiments, processor 119, memory 101, storage unit 121, input unit 120, output unit 123, communication unit 122 and SEP hardware module 102 may be implemented as part of any suitable device, e.g., such that processor 119, memory 101, storage unit 121, input unit 120, output unit 123, communication unit 122 and SEP hardware module 102 are enclosed in a common housing, packaging, or the like. In other embodiments, processor 119, memory 101, storage unit 121, input unit 120, output unit 123, communication unit 122 and SEP hardware module 102 may be implemented using a plurality of separate devices.

In some demonstrative embodiments, SEP hardware module 102 may utilize application-specific security-context with respect to a SEP application 103 to be executed, or being executed, by processor 111. The application specific security-context may include any suitable security-related information and/or data, e.g., one or more keys, assigned to the SEP application 103, e.g., as described below.

In some demonstrative embodiments, SEP hardware module 102 may be configured to bind the performing of a security-context-switch to switch to the security-context of a certain SEP application 103, together with assuring that processor 111 actually begins executing the certain SEP application 103 at an approved entry point of the certain SEP application 103, e.g., as described in detail below. The phrase "approved entry point" as used herein with respect to a SEP application may include an address of a first line of code and/or instruction of the SEP application; and/or one or more addresses, which may be approved by a creator of the SEP application as an approved entry point to the SEP application, e.g., as part of a certificate of the SEP application as described below.

In some demonstrative embodiments, SEP hardware module 102 may be configured to perform at least one of encrypting and decrypting data handled, used, utilized, generated and/or processed by a SEP application 103 (generally referred to as "data handled by the SEP application") being executed by processor 111. SEP hardware module 102 may be configured to perform at least one of the encrypting and decrypting using an application-specific application-key 115 corresponding to the SEP application 103 being executed, only if processor 111 begins execution of the SEP application 103 at an approved entry point of SEP application 103, e.g., as described in detail below.

In some demonstrative embodiments, application key 115 may be defined in a way such that application key 115 is not session-specific, for example, such that application key 115 remains unchanged for a given SEP application 103, e.g., even after rebooting of system 100, as described below. In other embodiments, application key 115 may be defined in any other suitable manner, such that application key 115 is session-specific or non-session specific. A "session" may include a period between a time at which SEP application 103 is "loaded" into memory 101 and a time at which SEP application is "unloaded" and/or no longer maintained by memory 101, e.g., as described below.

In some demonstrative embodiments, application-key 115 corresponding to SEP application 103 may be based at least on an internal key, e.g., a system key 108, a boot nonce, or any other suitable key, internally stored by SEP hardware module 102 and on application-specific information corresponding to the SEP application 103, e.g., as described in detail below.

In some demonstrative embodiments, the application-specific information corresponding to SEP application 103 may include application-specific information predefined by a creator of SEP application 103. In one embodiment, the application-specific information corresponding to SEP application 103 may include one or more of information representing a cryptographic key of the creator, e.g., a developer public key of the creator, and information identifying SEP application 103, e.g., as described in detail below. In other embodiments, the application-specific information may additionally or alternatively include any other suitable information, for example, information corresponding to at least part of the code of the application, e.g., a hash of at least part of the code. The phrase "public key" as used herein includes any suitable cryptographic public key, e.g., an asymmetric-cryptography public key, in accordance with any suitable cryptographic algorithm and/or method, e.g., the Rivest-Shamir-Adleman (RSA) encryption algorithm, or the like.

In some demonstrative embodiments, SEP hardware module 102 may be configured to allow encryption and/or decryption of data handled by SEP application 103, following which the data is to be stored, e.g., temporarily, in a memory, e.g., in memory 101 or in any other suitable memory external to SEP hardware module 102 or internally within SEP hardware module 102, e.g., as described below.

In some demonstrative embodiments, SEP hardware module 102 may include a memory encryption hardware module 112 to store in a memory, e.g., in memory 101 or in any other suitable memory external to SEP hardware module 102 or internally within SEP hardware module 102, encrypted data, which is encrypted using an application-specific memory encryption key 117 (also briefly referred to as "RAM key") corresponding to the SEP application 103 being executed, e.g., as described in detail below.

In some demonstrative embodiments, memory encryption key 117 may be defined in a way such that memory encryption key 117 is session-specific, for example, such that memory encryption key 117 for a given SEP application 103 may change, e.g., upon booting of system 100, as described below. In other embodiments, memory encryption key 117 may be defined in any other suitable manner, such that memory encryption key 117 is session-specific or non-session specific.

In some demonstrative embodiments, SEP hardware module 102 may be configured to determine memory encryption key 117 based at least on the application specific information corresponding to the SEP application 103. In some embodiments, RAM key 117 may also be based on system key 108 and/or a random boot value 118 (also referred to as a "boot nonce"), which is determined upon or after boot of system 100, e.g., as described in detail below.

In some demonstrative embodiments, SEP hardware module 102 may be configured to use an inter-application key 116 to encrypt and/or decrypt data communicated between the SEP application 103 being executed and another SEP application 103. Inter-application key 116 may be based, for example, on system key 108, the application-specific information corresponding to the SEP application 103 being executed and application-specific information corresponding to the other SEP application 103. In some demonstrative embodiments, SEP hardware module 102 may receive the application-specific information corresponding only to the other SEP application 103 from the SEP application 103 being executed, e.g., as described in detail below.

In some demonstrative embodiments, SEP hardware module 102 may be configured to determine a plurality of application-specific descriptor values 114 corresponding to a plurality of SEP applications 103 based at least on the application-specific information of the SEP applications 103, respectively; to store descriptor values 114; and to determine the application-key 115, RAM key 117 and/or inter-application key 116 corresponding to a certain SEP application 103 being executed, or to-be-executed, based on the descriptor value 114 corresponding to the certain SEP application 103, e.g., as described in detail below. In other embodiments, SEP hardware module 102 may be capable of determining application-keys 115, RAM key 117 and/or inter-application key 116 in any other suitable manner, which may or may not utilize descriptor values 114. For example, SEP hardware module 102 may store application keys 115 and/or RAM keys 117 corresponding to all of SEP applications 103, thereby obviating the need to determine and/or store descriptors 114, while requiring larger memory space.

In some demonstrative embodiments, SEP hardware module 102 may include a suitable cryptographic (crypto) engine 107 capable of performing any suitable cryptographic operations, for example, symmetric cipher operations, hash computation, asymmetric signature verification, and the like, which may be required by SEP hardware module 102, e.g., as described herein. For example, crypto engine 107 may encrypt and/or decrypt data handled by SEP application 103 being executed, e.g., using the suitable application-key 115, RAM key 117 and/or inter-application key 116 corresponding to the SEP application 103 being executed, e.g., as described below. Crypto engine 107 may securely maintain system key 108, e.g., such that system key 108 may not be available to any other component within SEP hardware module 102 and/or any other component of system 100.

In some demonstrative embodiments, SEP hardware module 102 may include a suitable hardware memory watcher 110 to prevent at least write-access, e.g., by processors 111 and/or 119 and/or any other element of system 100, to at least one set of memory addresses corresponding to the at least one SEP application 103, respectively. In one embodiment, memory watcher 110 may be configured to prevent at least write-access to the set of memory addresses of memory 101 based on a set of range registers 109. Range registers 109 may include, for example, a first pair of registers defining a first range of memory addresses assigned for application code 105 of SEP application 103, and a second pair of registers defining a second range of memory addresses assigned for data utilized by SEP application 103. If a single SEP application 103 occupies more than one continuous range, then multiple pairs of range registers 109 may be used. In other embodiments, hardware memory watcher 110 may be configured in any other suitable manner, while utilizing or not utilizing range registers 109.

In some demonstrative embodiments, SEP hardware module 102 may include any suitable "scratchpad" memory 113 to temporarily store data processed by processor 111.

In some demonstrative embodiments, processor 111 may execute instructions resulting in a SEP hardware control application 106 being capable of controlling one or more operations performed by SEP hardware module 102, e.g., with respect to SEP applications 103. For example, control application 106 may be capable of controlling a "loading" procedure of a SEP application 103; switching to execute a SEP application 103; and/or carrying out an "unloading" procedure of a previously-loaded SEP application 103, e.g., as described in detail below.

In some demonstrative embodiments, processor 1.19 may execute instructions resulting in a SEP driver application 125 capable of interfacing between SEP hardware module 102 and one or more elements of system 100 and/or applications executed externally to SEP hardware module 102, e.g., as described below.

In some demonstrative embodiments, SEP hardware module 102 may be capable of determining a boot nonce 118, e.g., upon boot of system 100, and storing boot nonce 118, e.g., as described herein. In other embodiments, SEP hardware module 102 may not store boot nonce 118, for example, if SEP hardware module 102 is configured to store the memory encryption keys 117 corresponding to all loaded SEP applications 103.

In some demonstrative embodiments, SEP hardware module 102 may perform a "load" procedure to "load" a SEP application 103. Such load procedure may be carried out, for example, when it is desired to execute a SEP application 103 for the first time after booting system 100, or after the SEP application 103 has been "unloaded", e.g., as described below.

In some demonstrative embodiments, when loading a SEP application 103, application code 105 of the SEP application 103 being loaded may be placed in a certain address range of memory 101, an indication of which may be provided to SEP hardware module 102; and an application certificate 104 corresponding to the SEP application 103 being loaded may be provided to SEP hardware module. One or more of these operations may be performed, for example, by SEP driver 125 and/or any other suitable driver or module of system 100.

In some demonstrative embodiments, SEP hardware module 102 may activate memory watcher 110 on the address range of the SEP application 103 being loaded, for example, by occupying range registers 109 with values representing the address range.

In some embodiments, SEP driver 125 may mark the memory ranges that are set in range registers 109 as "allocated", such that a host Operating System (OS) of system 100 does not attempt to overwrite them.

In some demonstrative embodiments, certificate 104 may include application-specific information corresponding to the SEP application 103 being loaded. The application-specific information may include, for example, information enabling to check the authenticity, of application code 105. For example, the application-specific information may include a signature, of any suitable format, spanning at least part of application code 105. Alternatively, the application-specific information may include any signature-like or any other suitable information enabling to check the authenticity of application code 105 against a given creator.

In some demonstrative embodiments, the application-specific information may include application-creator information predefined by a creator of the SEP application 103 being loaded. In some demonstrative embodiments, the application-creator information may include information representing a developer public key of the creator, and/or information identifying SEP application 103, e.g., in the form of an application identity (ID) identifying the application and/or a version ID identifying a version of the application, and the like. In other embodiments, the application-specific information may additionally or alternatively include any other suitable information, for example, information corresponding to at least part of application code 105 of the application, e.g., a hash of at least part of application code 105.

In some demonstrative embodiments, certificate 104 may include a developer public key; a developer-unique application identity (ID); an application-unique version ID; and a signature spanning the entire application code and the developer public key, application ID and version ID. In other embodiments, certificate 104 may include any additional or alternative information.

In some embodiments, certificate 104 may optionally include information, e.g., in the form of one or more addresses, identifying one or more approved entry points of SEP application 103, e.g., as defined by the creator of SEP application 103.

In some demonstrative embodiments, SEP hardware module 102 may verify certificate 104. For example, SEP hardware module 102 may determine a hash value of application code 105 of the SEP application 103 being loaded, and concatenate the determined hash with the values of the developer public key, the application ID, the version ID included in certificate 104 and/or any other values, to reproduce a hash that was used to create the signature on certificate 104. SEP hardware module 102 may terminate the loading procedure, e.g., if verification fails.

In one embodiment, the developer public key is generated by the developer, and is used to verify signatures made by the developer, while the public key is not necessarily certified by any third party.

In some demonstrative embodiments, if verification passes, SEP hardware module 102 may determine an application-specific descriptor 114 corresponding to the SEP application 103 being loaded, for example, by determining the hash of the developer public key, the application ID, and the version ID corresponding to the SEP application 103 being loaded.

In some demonstrative embodiments, SEP hardware module 102 may store descriptor 114, and range registers 109, corresponding to each loaded SEP application 103, e.g., as long as the SEP application 103 is loaded. Descriptor 114 may be used to compute application key 115, RAM key 117 and inter-application key 116, e.g., as described below. In other embodiments, SEP hardware module 102 may not maintain descriptor 114, for example, if SEP hardware module 102 reproduces descriptor 114, whenever needed, by reading certificate 104, e.g., given this certificate was kept securely following its verification, or is constantly re-verified. This arrangement, however, may be considered as inefficient use of resources in some situations, for example, if execution may switch between applications at relatively high frequency.

In some demonstrative embodiments, SEP hardware module 102 may include a current application key register 131 to maintain the application key 115 of the SEP application 103 being executed, and/or a current RAM key register 132 to maintain the current RAM key 117 of the SEP application 103 being executed by processor 111. SEP hardware module 102 may determine the current values of the application-key 115 and/or RAM key 117 based on the stored descriptor 114 upon calling the SEP application 103, e.g., as described below. In other embodiments, SEP hardware module 102 may store application key 115 and/or RAM key 117 per each loaded SEP application 103, e.g., to increase performance by eliminating repeated derivation of the key values. In other embodiments, any other suitable number and/or configuration of registers may be implemented to store some or all of the keys of some or all of the loaded SEP applications 103. SEP hardware module 102 may also include an inter-application key register to store inter-application key 116 used by the SEP application 103 being executed, e.g., as described below.

In some demonstrative embodiments, SEP hardware module 102 may perform a "calling" procedure, for example, each time it is desired to execute a SEP application 103 ("the target SEP application"), e.g., other than an application being executed by processor 111. In one embodiment, processor 111 may execute only a single SEP application 103 at any given time. When no SEP application 103 is being executed, control application 106 may run, holding processor 111 in a standby state. In some demonstrative embodiments, execution of SEP applications 103 that run in processor 111 may not be interrupted but may only terminate when the SEP application 103 terminates.

In some demonstrative embodiments, a request to execute a pre-loaded SEP application 103 may be received, for example, from SEP driver 125, e.g., serving a request from an application running on processor 119; or from control application 106, e.g., following either a request of a running SEP application 103 or of control application 106 being executed by processor 111.

In some demonstrative embodiments, upon receiving the call to the target SEP application 103, SEP hardware module 102 may jointly perform both a security-context-switch to security context of the target SEP application 103 together with assuring that the program counter of processor 111 is set to point to an approved entry-point of the target SEP application 103, e.g., as described in detail below.

In some demonstrative embodiments, SEP hardware module 102 may receive a reference to the target SEP application 103, for example, in the form of an address or a handle. When receiving a handle, SEP hardware module 102 may force processor 111, e.g., by setting the value of a program counter of processor 111, to commence the execution of instructions at an approved entry point, e.g., the first address, of the memory range indicated by the handle. If the target is specified using an absolute address, then SEP hardware module 102 may force the program counter of processor 111 to contain the provided address, for example, only if the provided address matches an approved entry point of a loaded SEP application 103, e.g., as defined by certificate 104 and/or range registers 109.

In some demonstrative embodiments, the security-context-switch may include disabling, deactivating and/or erasing all security-key information corresponding to the currently executed SEP application 103, and loading any required security-key information corresponding to the target SEP application 103.

In some demonstrative embodiments, SEP hardware module 102 may perform the calling procedure, for example, by erasing scratchpad memory 113; erasing the currently held application key 115, e.g., from application key register 131; erasing the currently held inter-application key 116; erasing the currently held RAM key 117, e.g., from RAM key register 132; forcing processor 111 to resume execution of instructions at an approved entry point of the target SEP application 103, e.g., the first address of the range defined by registers 109 corresponding to the target SEP application; recalling or recomputing the descriptor 114 of the target SEP application 103; determining and/or loading the application key 115 of the target SEP application 103 to application key register 131; determining and/or loading the RAM key 117 of the target SEP application 103 to RAM key register 132.

The above operations may be considered "must succeed" operations, and SEP hardware module 102 may reset system 100, for example, whenever any of the sequence of operations fails.

It should be noted that in some embodiments any SEP application 103 may, at its own discretion, execute portions of other applications, without carrying out the security-context-switch. For example, the SEP application 103 may instruct processor 111 to jump to a memory address, which belongs to another application, whether another SEP application 103 or any other application. Such an action by a SEP application 103 may cause portions of another application to be executed. This may happen, for example, when a SEP application 103 calls a shared library.

In some demonstrative embodiments, SEP hardware module 102 may be configured to perform an "unloading" procedure to unload a previously loaded SEP application 103, e.g., if the SEP application 103 is no longer needed. For example, SEP driver 125 may trigger the unloading procedure, e.g., in response to a request from a host application being executed by system 100, by control application 106, or by a SEP application 103 other than the SEP application 103 to be unloaded.

In some demonstrative embodiments, the unloading of a SEP application 103 may include removing the SEP application 103 from memory 101, and erasing any security-context corresponding to the SEP application 103, e.g., as described below.

In some demonstrative embodiments, if the SEP application 103 to be removed is currently being executed by processor 111, then SEP hardware module 102 may erase the security-context corresponding to the SEP application 103 being unloaded, for example, by clearing scratchpad memory 113; clearing the current application-key 115, e.g., from current application key register 131; clearing the current RAM key 117, e.g., from current RAM key register 132; and clearing the current inter-application-key 116.

In some embodiments, SEP hardware module 102 may erase the security-context corresponding to the SEP application 103 being unloaded, for example, by clearing the descriptor 114 of the SEP application 103 to be unloaded; clearing any other registers, if any, which were used to cache the application-key 115 and/or RAM key 117 of the SEP application 103 to be unloaded; and clearing range registers 109 corresponding to the SEP application 103 to be unloaded.

In some demonstrative embodiments, SEP hardware module 102 may allow a SEP application 103 to store "private" data in any suitable non-volatile storage. Such private secure storage may be application-specific, such that each SEP application 103 may protect its own data from unauthorized disclosure and/or from unauthorized modification, for example, by host applications, other SEP applications 103 and/or external examination of the storage.

In some demonstrative embodiments, SEP hardware module 102 may not implement the secure storage mechanism itself, but rather provide each SEP application 103 with suitable encryption and/or decryption mechanism of the secured data. In an alternative embodiment, an external secure storage module may be implemented, for example, as a "secure storage" SEP application 103 that serves one or more other SEP applications 103 using the inter-application key mechanism as described herein. The secure storage may be implemented in any other suitable manner.

In some demonstrative embodiments, SEP hardware module 102 may enable the application-specific secure storage by providing the application-specific application key 115 to crypto engine 107 in order to encrypt data to be stored by each SEP application 103 and/or decrypt stored data to be utilized by the SEP application 103, upon request of the SEP application 103.

In some demonstrative embodiments, application key 115 is not dependent on boot nonce 118, and may thus be unchanged for a SEP application 103 across loads and/or across power cycles of system 100.

In some demonstrative embodiments, a SEP application 103 may request from SEP hardware module 102 the encrypting and/or decrypting of data, and SEP hardware module 102, e.g., crypto engine 107, may encrypt and/or decrypt the data using the application-key 115 corresponding to the requesting SEP application 103.

In some demonstrative embodiments, while each SEP application 103 may request encryption and/or decryption operations using its own application key 115, as may be stored in current application key register 131, the SEP application 103 itself may not obtain the value of the application key 115. Neither the SEP application 103 nor any other application may derive the value of application key 115, even when given the non-secret descriptor 114, since system key 108 is not available outside crypto engine 107.

In one embodiment, the value of application key 115 is made available, e.g., by storage in current application key register 131, only as part of a security-context-switch, which is performed jointly with forcing execution of code from an approved entry point of the SEP application being executed.

In some demonstrative embodiments, SEP hardware module 102 may determine the application key 115, denoted $K_A$, corresponding to the SEP application 103 being executed or to be executed by processor 111, for example, as follows:

$$K_A \leftarrow \text{SHA}(\text{SystemKey} \| \text{`APPK'} \| d) \quad (1)$$

wherein d denotes the descriptor 114 corresponding to the SEP application 103 being executed, wherein the notation "∥" denotes a concatenation, wherein "SystemKey" denotes system key 108, wherein 'APPK' denotes the string 'APPK' or any other suitable string, and wherein SHA denotes a suitable hash function.

In some demonstrative embodiments, SEP hardware module 102 may assign the determined value of $K_A$ to current application key register 131, and the SEP application 103 being executed may be allowed only to use the currently stored application key 131. Masquerading as a certain SEP application 103 in an attempt to obtain access to encryption and/or decryption services using its application key 115 may not be feasible by any SEP application 103 that was generated by another developer, e.g., because the application key 115 is one-way reliant on the descriptor 114, wherein the descriptor 114 itself is reliant on the public key that the application code 105 was verified against, and of which the private counterpart is available only to the developer. Therefore, given that only one private key matches the public key, and that the matching private key is securely kept by the developer, such masquerading is made infeasible.

In some demonstrative embodiments, a SEP application 103 may be capable of using more than one key for its secure storage, such as one for encryption of data and one for integrity protection. In such a case, the SEP application 103 may treat application key 115 as a master key and use application key 115 to wrap other, e.g., randomly generated, keys.

In some demonstrative embodiments, SEP hardware module 102 may allow secure inter-application communication between SEP applications 103, e.g., as described below.

In some demonstrative embodiments, a SEP application 103 may be coded with, or coded to obtain, the identity of one or more other SEP applications 103 trusted by the SEP application 103. SEP hardware module 102 may be configured to assure each of a pair of communicating SEP applications 103 that data coming from the other SEP application 103 is authentic, e.g., as described below.

In some demonstrative embodiments, SEP hardware module 102 may provide the pair of communicating SEP applications 103 with a common inter-application key 116 to be used for the secure communication, for example, by protecting the secrecy and/or the integrity of data using means that are implemented by the SEP applications 103. SEP hardware module 102 may be configured to assure each of the pair of SEP applications 103 that only the intended other SEP application 103 is able to use the assigned inter-application-key 116.

In some demonstrative embodiments, each inter-application key 116 may be identified by the descriptors 114 of the two SEP applications 103 that use the inter-application key 116 to securely share data. Therefore, no impersonation can take place by applications that were not developed by the same developer of the authentic application. A SEP application 103 that was signed by a different developer, or which was indicated by the developer to be different, e.g., in its application ID and/or version ID, from an application "a" will have a different value for its descriptor 114 from that of application "a", and hence will be treated as a different application from the application "a" when generating inter-application key 116. A different application than "a" will not be able to interact with any other application "b" disguising itself as "a".

In some demonstrative embodiments, SEP hardware module 102 may store inter-application key 116 in a special register, which may be populated, for example, only when the SEP application 103 being executed requests so. Once the inter-application key register is populated, the SEP application 103 being executed can request encryption and/or decryption operations to be performed, e.g., by crypto engine 107, using the inter-application key 116 being stored in the inter-application key register.

In some demonstrative embodiments, the SEP application 103 being executed may request SEP hardware module 102 to populate the inter-application key register, for example, when the SEP application 103 needs to send, receive, read and/or write application data coming from, or going to, a target SEP application 103.

In some demonstrative embodiments, the SEP application 103 being executed may provide SEP hardware module 102 with the descriptor value 114 of the target SEP application 103. SEP hardware module 102 may determine the inter-application key 116, denoted $K_I$, corresponding to both the SEP application 103 being executed and the target SEP application 103, for example, as follows:

$$K_I \leftarrow \text{SHA}(\text{SystemKey} \| \text{`IAPPK'} \| d_1 \| d_2) \quad (2)$$

wherein $d_1$ and $d_2$ denote the descriptors of the SEP application 103 being executed and the target SEP application 103, respectively or in any other pre-defined order; and wherein 'IAPPK' denotes the string IAPPK or any other suitable string. The order of the values of descriptors $d_1$ and $d_2$, within the above computation, may be modified, if needed, for example, to follow a predefined order, such as a lexicographic order.

In some demonstrative embodiments, SEP hardware module 102 may set the value of the inter-application key register 116 to be the determined value of $K_I$.

In some demonstrative embodiments, the value of the inter-application key 116 may be persistent through executions. This may allow data that was written in an encrypted form by one SEP application 103 to be read by another SEP application 103, e.g., later on; and/or exporting and importing data among different versions of the same SEP application 103, which have different descriptor values 114.

In some demonstrative embodiments, SEP hardware module 102 may replace inter-application key 116, for example, when the SEP application 103 being executed requests an inter-application key 116 to be used with respect to another SEP application 103. SEP hardware module 102 may clear the inter-application key register, when another SEP application 103 is called for execution, e.g., as described above.

In some demonstrative embodiments, SEP hardware module 102 may determine the RAM key 117, denoted $K_R$, for example, as follows:

$$K_R \leftarrow \text{SHA}(\text{SystemKey} \| \text{`RAMK'} \| \text{BootNonce} \| d) \quad (3)$$

wherein BootNonce denotes boot nonce 118, and wherein 'RAMK' denotes the string RAMK or any other suitable string.

In some demonstrative embodiments, SEP hardware module 102 may assign the determined value of $K_R$ to the RAM key register 132.

In some demonstrative embodiments, the SEP application 103 being executed and/or memory encryption module 112 may use the value of the RAM key 117, e.g., as maintained by current RAM key register 132, to encrypt data stored in memory 101, e.g., temporarily.

In some demonstrative embodiments, SEP hardware module 102, e.g., as described above, may provide hardware-level separation to running SEP applications 103, thereby protecting SEP applications 103 from each other. As opposed to other frameworks that provide separation that is only as robust as the managing application, the separation provided by SEP hardware module 102 may be reliant only on the soundness of the hardware logic and on the hardware integrity of SEP hardware module 102.

In some demonstrative embodiments, SEP hardware module 102 may provide robust separation between running SEP applications 103 in a way that is not reliant on the SEP applications 103 themselves or on any other piece of software. This feature may allow SEP applications 103 to be mutually-distrusting. Therefore, SEP applications 103 do not need to come from the same source, do not need to be cross examined, and/or do not require any relationship between their owners before they can be executed on the same system 100.

In some demonstrative embodiments, the fact that SEP hardware module 102 may assure that a running SEP application 103 cannot compromise the security of any other running application implies that SEP hardware module 102 may be treated as an open secure execution platform on which arbitrary security-sensitive code can run. SEP applications 103 executed by SEP hardware module 102 do not need to be certified and/or signed by a centralized authority, or by any authority. Every developer is free to introduce new code that will run securely by SEP hardware module, e.g., without any need for pre-enrollment or costly accreditation. Trust that exists between code modules of different developers can be enforced by SEP hardware module 102 for sharing data securely without affecting the versatility of system 100 as a whole. SEP hardware module 102 may allow SEP applications 103 to securely identify each other, if they so desire, but to also run securely without carrying any useful identity.

Figure 2:
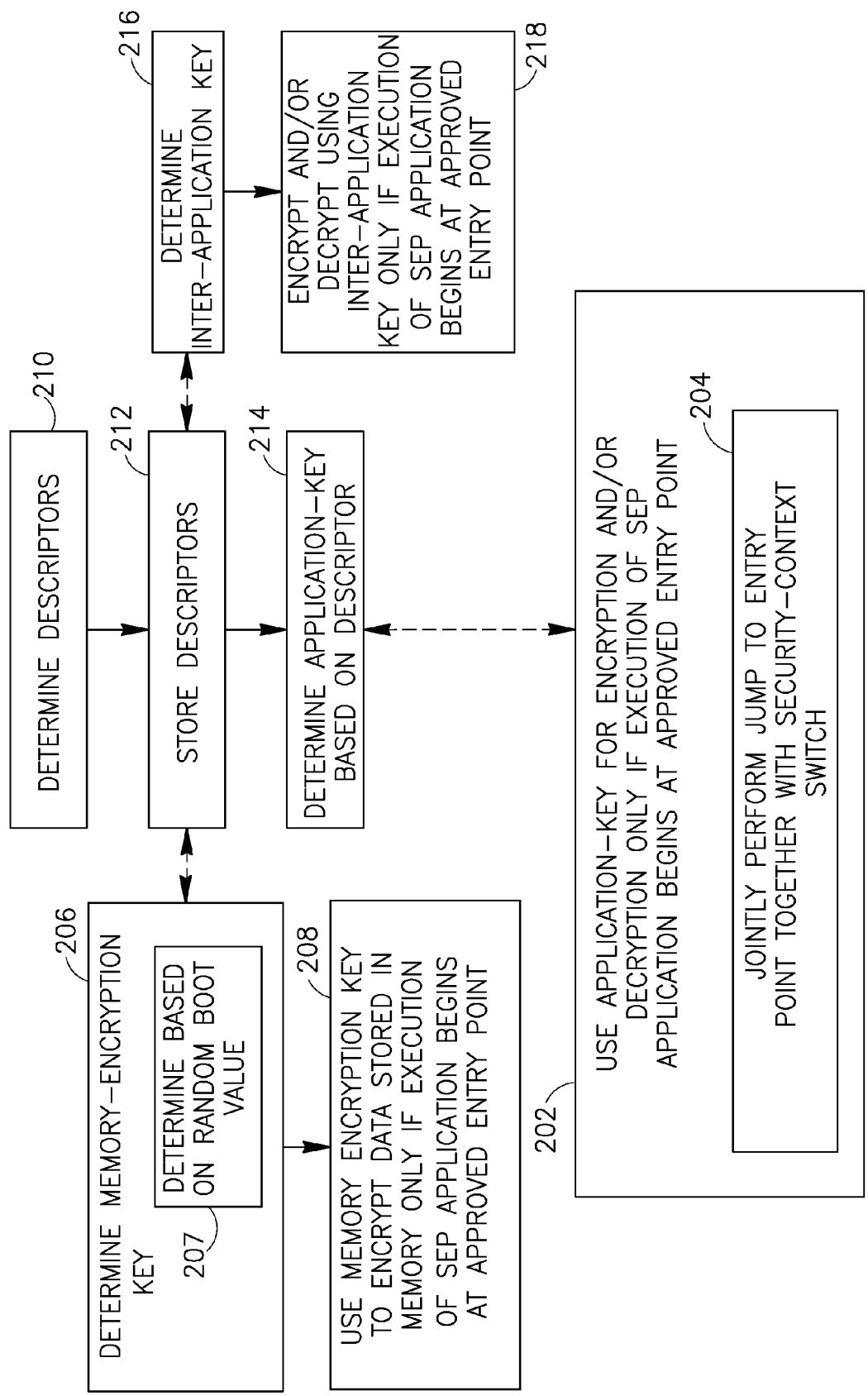
FIG. 2 is a schematic illustration of a method of executing at least one secure-processing (SEP) application, in accordance with some demonstrative embodiments.

Reference is now made to FIG. 2, which illustrates a method of executing at least one SEP application, in accordance with some demonstrative embodiments. In some demonstrative embodiments, one or more operations of the method of FIG. 2 may be performed by system 100 (FIG. 1) and/or SEP hardware module 102 (FIG. 1).

As indicated at block 202, the method may include performing at least one of encrypting data and decrypting data handled by the SEP application using an application-specific application-key corresponding to the SEP application, only if execution of the SEP application begins at an approved entry point of the SEP application. The application-key corresponding to the SEP application may be based at least on an internal key, e.g., a system key and/or a boot nonce, and on application-specific information corresponding to the SEP application. In some embodiments, the application-specific information includes information defined by a creator of the SEP application, e.g., as descried above. For example, SEP hardware module 102 (FIG. 1) may encrypt and/or decrypt data for a SEP application 103 (FIG. 1) using application key 115 (FIG. 1) corresponding to the SEP application 103 (FIG. 1), only if processor 111 (FIG. 1) begins execution at an approved entry point of the SEP application 103 (FIG. 1), e.g., as described above.

As indicated at block 204, the method may include jointly performing both forcing a processor to commence execution at ("jump to") an approved entry point of the SEP application, and switching to the security-context corresponding to the SEP application, wherein the security context includes information, which may allow determining the application-key corresponding to the SEP application. For example, SEP hardware module 102 (FIG. 1) may jointly perform both forcing of processor 111 (FIG. 1) to jump to an approved entry point of the SEP application 103 (FIG. 1), together with switching to the security context, e.g., application key 115 (FIG. 1) and/or RAM key 117 (FIG. 1), corresponding to the SEP application 103 (FIG. 1), e.g., as described above.

As indicated at block 210, the method may include determining a plurality of application-specific descriptor values corresponding to a plurality of SEP applications based at least on the application-specific information of the SEP applications, respectively. For example, SEP hardware module 102 (FIG. 1) may determine the plurality of descriptors 114 (FIG. 1) corresponding to the plurality SEP applications 103 (FIG. 1), respectively, for example, as part of the loading procedure, e.g., as described above.

As indicated at block 212, the method may include storing the descriptor values. For example, SEP hardware module SEP hardware module 102 (FIG. 1) may store descriptors 114 (FIG. 1), for example, as part of the loading procedure, e.g., as described above.

As indicated at block 214, the method may include determining the application-key corresponding to a certain SEP application being executed, or to-be executed, based on the descriptor value corresponding to the SEP application. For example, SEP hardware module 102 (FIG. 1) may determine the application key 115 (FIG. 1) corresponding to the SEP application 103 (FIG. 1) being executed, or to-be executed, e.g., as described above.

As indicated at block 206, the method may include determining an application-specific memory encryption key corresponding to the SEP application based at least on the internal key and/or on the application-specific information. For example, SEP hardware module 102 (FIG. 1) may determine RAM key 117 (FIG. 1) corresponding to the SEP application 103 (FIG. 1), e.g., as described above. In one embodiment, determining the memory encryption key corresponding to the SEP application may include determining the memory encryption key based on the descriptor corresponding to the SEP application, e.g., as described above.

As indicated at block 207, determining the memory encryption key may include determining the memory encryption key based also on a random boot value, which is determined upon boot. SEP hardware module 102 (FIG. 1) may determine RAM key 117 (FIG. 1) based on boot nonce 118 (FIG. 1), e.g., as described above.

As indicated at block 208, the method may include storing in a memory encrypted data, which is encrypted using the memory encryption key, for example, only if execution of the SEP application begins at an approved entry point of the SEP application. For example, memory encryption module 112 (FIG. 1) may store in memory 101 (FIG. 1) encrypted data, which is encrypted using RAM key 117 (FIG. 1), corresponding to the SEP application 103 (FIG. 1), e.g., as described above.

As indicated at block 216, the method may include determining an inter-application key based on the internal key, e.g., the system key, the application-specific information corresponding to a SEP application being executed and application-specific information corresponding to the other SEP application. In one embodiment, determining the inter-application key may include determining the inter-application key based on the descriptors corresponding to the SEP application being executed and the other SEP application. For example, SEP hardware module 102 (FIG. 1) may determine inter-application key 116 (FIG. 1) based on the descriptor 114

(FIG. 1) of the SEP application 103 (FIG. 1) being executed and the descriptor 114 (FIG. 1) of the other SEP application 103 (FIG. 1), e.g., as described above.

As indicated at block 218, the method may include performing at least one of encrypting and decrypting data communicated between the SEP application being executed and another SEP application using the inter-application key, for example, only if execution of the SEP application begins at an approved entry point of the SEP application. For example, SEP hardware module 102 (FIG. 1) may encrypt and/or decrypt data communicated between the two SEP applications using inter-application key 116 (FIG. 1), e.g., as described above.

Some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some demonstrative embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device including:
a secure-processing (SEP) hardware module including a processor capable of executing at least one SEP application,
wherein the SEP hardware module is configured to perform at least one of encrypting and decrypting data handled by the SEP application using an application-specific application-key corresponding to the SEP application, only if the processor begins execution of the SEP application at an approved entry point of the SEP application,
and wherein the application-key corresponding to the SEP application is based at least on an internal key internally stored by the SEP hardware module and on application-specific information corresponding to the SEP application,
wherein the SEP hardware module is configured to determine a plurality of application-specific descriptor values corresponding to a plurality of SEP applications based at least on application-specific information of the SEP applications, respectively; to store the descriptor values; and to determine the application-key corresponding to the SEP application based on the descriptor value corresponding to the SEP application.

2. The device of claim 1, wherein the application-specific information includes one or more of information representing a developer public key of the creator, and information identifying the SEP application.

3. The device of claim 1, wherein the SEP hardware module includes a memory encryption hardware module to store in a memory encrypted data, which is encrypted using an application-specific memory encryption key corresponding to the SEP application,
wherein the SEP hardware module is configured to determine the memory encryption key based at least on the application-specific information.

4. The device of claim 3, wherein the memory encryption key is based also on a random boot value, which is determined upon boot.

5. The device of claim 1, wherein the SEP hardware module is configured to use an inter-application key to encrypt and decrypt data communicated between first and second SEP applications, and wherein the inter-application key is based at least on the internal key, the application-specific information corresponding to the first SEP application and application-specific information corresponding to the second SEP application.

6. The device of claim 5, wherein the SEP hardware module is to receive the application-specific information corresponding to the second SEP application from the first SEP application.

7. The device of claim 1, wherein the SEP hardware module includes a hardware memory watcher to prevent at least write-access to at least one set of memory addresses corresponding to the at least one SEP application, respectively.

8. A method of executing at least one secure-processing (SEP) application, the method including:
only if execution of the SEP application begins at an approved entry point of the SEP application, performing at least one of encrypting and decrypting data handled by the SEP application using an application-specific application-key corresponding to the SEP application,
wherein the application-key corresponding to the SEP application is based at least on an internal key and on application-specific information corresponding to the SEP application, wherein the method further comprises:
determining a plurality of application-specific descriptor values corresponding to a plurality of SEP applications based at least on the application-specific information of the SEP applications, respectively;
storing the descriptor values; and
determining the application-key corresponding to a SEP application of the plurality of SEP applications based on the descriptor value corresponding to the SEP application.

9. The method of claim 8 including jointly performing both forcing a processor to jump to the approved entry point of the SEP application, and switching to security-context corresponding to the SEP application, wherein the security context includes information, which allows determining the application-key corresponding to the SEP application.

10. The method of claim 8, wherein the application-specific information includes one or more of information representing a developer public key of the creator, and information identifying the SEP application.

11. The method of claim 8 comprising:
determining an application-specific memory encryption key corresponding to the SEP application based at least on the application-specific information; and storing in a memory encrypted data, which is encrypted using the memory encryption key.

12. The method of claim 11, wherein determining the memory encryption key includes determining the memory encryption key based also on a random boot value, which is determined upon boot.

13. The method of claim 8 comprising:
determining an inter-application key based on the internal key, the application-specific information corresponding to a SEP application and application-specific information corresponding to another SEP application; and
performing at least one of encrypting and decrypting data communicated between the SEP application and the other SEP application using the inter-application key.

14. A system including:
a memory to store at least one secure-processing (SEP) application; and
a SEP hardware module including a processor capable of executing the at least one SEP application,
wherein the SEP hardware module is configured to perform at least one of encrypting and decrypting data handled by the SEP application using an application-specific application-key corresponding to the SEP application, only if the processor begins execution of the SEP application at an approved entry point of the SEP application,
and wherein the application-key corresponding to the SEP application is based at least on an internal key internally stored by the SEP hardware module and on application-specific information corresponding to the SEP application,
wherein the secure-processing hardware module is configured to use an inter-application key to encrypt and decrypt data communicated between the first and second SEP applications, and wherein the inter-application key is based on the internal key, the application-specific information corresponding to the first SEP application and application-specific information corresponding to the second SEP application.

15. The system of claim 14, wherein the application-specific information includes one or more of information representing a developer public key of the creator, and information identifying SEP application.

16. The system of claim 14, wherein the secure-processing hardware module includes a memory encryption hardware module to store in a memory encrypted data, which is encrypted using an application-specific memory encryption key corresponding to the SEP application being executed,
wherein the secure-processing hardware module is configured to determine the memory encryption key based at least on the application-specific information.

17. The system of claim 16, wherein the memory encryption key is based also on a random boot value, which is determined upon boot.

18. The system of claim 14, wherein the secure-processing hardware module is configured to determine a plurality of application-specific descriptor values corresponding to a plurality of SEP applications based at least on the application-specific information of the SEP applications, respectively; to store the descriptor values;
and to determine the application-key corresponding to a SEP application of the plurality of SEP applications based on the descriptor value corresponding to the SEP application.

19. The system of claim 14, wherein the SEP hardware module is to receive the application-specific information corresponding to the second SEP application from the first SEP application.

20. The system of claim 14, wherein the SEP hardware module is configured to prevent the disclosure of the application key to the SEP application.

21. The system of claim 14, wherein the SEP hardware module includes a hardware memory watcher to prevent at least write-access to at least one set of memory addresses corresponding to the at least one SEP application, respectively.

* * * * *